(12) United States Patent
Morimoto et al.

(10) Patent No.: US 6,716,521 B1
(45) Date of Patent: Apr. 6, 2004

(54) POLYESTER COMPOSITION, FILM MADE THEREOF, AND MAGNETIC RECORDING MEDIUM

(75) Inventors: Tsutomu Morimoto, Otsu (JP); Toshihiro Tsuzuki, Kyoto (JP); Tai Sasamoto, Yokohama (JP)

(73) Assignee: Toray Industries, Inc., Tokyo (JP)

( * ) Notice: Subject to any disclaimer, the term of this patent is extended or adjusted under 35 U.S.C. 154(b) by 195 days.

(21) Appl. No.: 09/831,706

(22) PCT Filed: Aug. 2, 2000

(86) PCT No.: PCT/JP00/05162
§ 371 (c)(1),
(2), (4) Date: May 14, 2001

(87) PCT Pub. No.: WO01/19902
PCT Pub. Date: Mar. 22, 2001

(30) Foreign Application Priority Data

| Sep. 14, 1999 | (JP) | 11-259913 |
| Oct. 25, 1999 | (JP) | 11-301960 |
| Oct. 25, 1999 | (JP) | 11-302040 |

(51) Int. Cl.$^7$ .................. B32B 11/02; B32B 27/02; B32B 15/04
(52) U.S. Cl. .................. 428/323; 428/329; 428/336; 428/694 ST; 428/694 T; 428/694 SL; 428/694 SG
(58) Field of Search .................. 428/694 ST, 694 SL, 428/694 SG, 692, 458, 457, 480, 402, 404, 323, 325, 900, 329; 528/286; 524/706–710

(56) References Cited

U.S. PATENT DOCUMENTS

| 4,590,119 A | 5/1986 | Kawakami et al. | 428/216 |
| 6,083,617 A | * 7/2000 | Aoyama et al. | 428/327 |

* cited by examiner

Primary Examiner—D. S. Nakarani
Assistant Examiner—Nikolas J Uhlir
(74) Attorney, Agent, or Firm—Kubovcik & Kubovcik

(57) ABSTRACT

A polyester film containing 0.1 to 2.0% by weight of a wax compound formed from an aliphatic carboxylic acid and an aliphatic alcohol or a constituent of the wax compound, and having thereon large protuberances having a maximum diameter of not smaller than 2 μm at a density of 20 protuberances/mm$^2$.

25 Claims, No Drawings

POLYESTER COMPOSITION, FILM MADE THEREOF, AND MAGNETIC RECORDING MEDIUM

TECHNICAL FIELD

The present invention relates to a polyester film, more specifically a polyester film having few large protuberances and defects and having good oligomer deposition preventing properties and productivity, and also to a magnetic recording medium using the film.

The present invention also relates to a polyester composition which has good heat resistance, which, when used in a film, exhibits good running ability and abrasion resistance, and which is particularly suitable for use in a magnetic recording medium; a film using the composition; and a magnetic recording medium using the film.

BACKGROUND ART

Polyester films, particularly polyethylene terephthalate (PET) films, have been widely used for industrial purposes due to their good mechanical, thermal and electrical properties, and are now in increasing demand. However, the properties and productivity required for polyesters have become increasingly severe in various applications as the range of uses of and the demand for polyesters have grown. Therefore, although polyesters have been produced for various purposes including industrial purposes and for use in magnetic materials, they still have many problems that need to be overcome.

When a polyester film is used in a magnetic recording medium, the formation of large protuberances or defects on the surface of the film must be minimized for achieving a high recording density. However, a polyester film has a serious problem of an oligomer. In the esterification of a polyester, an oligomer may be produced as a by—product. In the case of PET, an oligomer mainly comprising an ethylene terephthalate cyclic trimer is usually contained at a concentration of about 1 to 3% by weight. If such a polyester or PET is formed into a film, an oligomer is likely to be deposited on the surface of the film over time, leading to the formation of large protuberances on the surface. In particular, when the film is used in a magnetic material film, the large protuberances based on the oligomer deposited on the surface of the film may cause the drop out on the magnetic layer. Accordingly, one of the problems in this application is to prevent the deposition of an oligomer on the surface of the film.

For overcoming the problem, it has been proposed to add an ester of an aliphatic monocarboxylic acid to prevent the accumulation of a low molecular weight substance (e.g., an oligomer) on a drum during the manufacture of a film, as disclosed in Japanese Unexamined Patent Application Publication No. 58-145418. In this technique, however, there is a problem of forming large protuberances on the surface which are based on foreign particles contained in the substance added, and the oligomer deposition preventing effect after the formation of the film is unsatisfactory. It is also proposed to add an additive such as an organic sulfonic acid alkali metal salt to prevent the deposition of an oligomer on the'surface of a film, as described in Japanese Unexamined Patent Application Publication No. 11-188825. In this technique, however, dimples (defects) are formed on the surface of the film and the film forming ability is reduced. Therefore, the films manufactured by these techniques are hardly usable in magnetic recording media, from the viewpoint of smoothness of the film surface.

On the other hand, it is generally employed to add particles for the purpose of improving handling properties and quality of an article manufactured from the film, or for forming proper protuberances/dimples on the surface of the film to provide sliding properties and abrasion resistance to the film or an article produced from the film (which are required for providing smooth process passage properties during the manufacture or processing of the film).

The particles that are generally used include inorganic particles, such as particles of silicon oxide, aluminum oxide, titanium oxide, calcium carbonate, barium sulfate, calcium phosphate, talk, kaolin, zeolite, calcium fluoride, lithium fluoride and molybdenum sulfate; organic particles, such as particles of silicone resin, fluororesin, cross-linked polystyrene resin and cross-linked acrylic resin; and particles deposited during the esterification of a polyester.

Among these, spherical silicon oxide particles are frequently used. However, the particles have poor abrasion resistance and, when used in a film, may be taken off from the film, causing troubles.

A polyester composition containing particles of a compound oxide mainly comprising silicon dioxide and aluminum oxide is proposed in WO 96/32443. A biaxially oriented polyester film using aluminum silicate particles to improve abrasion resistance is proposed in Japanese Unexamined Patent Application Publication No. 11-130878.

However, further improvement is required in friction properties and abrasion resistance,as the processing speed is increased. In most case, such a film is used after the repeated running. Therefore, even if the film initially exhibits good friction properties, the film is required not to be degraded with the passage of time.

In the field of magnetic tape, higher qualities of a finished article (e.g., the levels of quality and density of an image) have also been required than in the past. Therefore, higher sliding properties and abrasion resistance than those of polyester films produced by conventional methods have been strongly demanded. In particular, the recording density of a magnetic tape can be dramatically improved by forming a magnetic recording layer on a metal-deposited layer. However, since such a magnetic recording layer is thin and smooth, the film is highly susceptible to friction. In addition, when the film is taken up in a roll, the surface profile of the rear side is readily transferred to the front surface, causing recording defects. In the vacuum evaporation process, on the other hand, enormous amounts of thermal loading are applied to the film and, at the same time, a highly vacuum state is maintained around the film. If the film is poor in heat resistance, there is a concern about coloration of the film or any adverse effect of a decomposition product on the film. Therefore, higher heat resistance is required for the film.

Accordingly, the first object of the present invention is to provide a polyester film having few large protuberances and defects, and having good surface properties, oligomer deposition preventing properties and productivity.

The second object of the present invention is to provide a polyester composition which has dramatically improved friction properties and abrasion resistance and improved dispersibility while maintaining the good properties of the conventional compositions, which is capable of achieving extremely high-definition surface properties when made into a film, and which is particularly useful for production of a high-density magnetic recording medium.

DISCLOSURE OF INVENTION

The first object of the present invention can be achieved by using a polyester film containing a wax compound formed from an aliphatic carboxylic acid and an aliphatic alcohol or a constituent of the wax compound at a concentration of 0.1 to 2.0% by weight, and having thereon large protuberances having maximum diameters of not smaller than 2 μm at a density of 20 protuberances/mm$^2$.

The second object of the present invention can be achieved by using a polyester composition comprising a polyester resin; and inorganic particles which mainly consist of a compound oxide of silicon dioxide and aluminum oxide and additionally contain ions of elements in group Ia of the periodic table, wherein on a molar basis 80 to 100% of the ions are potassium ions; the ratio (on molar basis) of silicon element to aluminum element, and the ratio (on molar basis) of ions of elements in group Ia of the periodic table to aluminum element in the inorganic particles satisfying the following equations, respectively:

$0.1 \leq Al/Si \leq 0.4$; and $0.8 \leq$ [ions of elements in group Ia of the periodic table]$/Al \leq 1.2$.

BEST MODE FOR CARRYING OUT THE INVENTION

The wax compound according to the present invention is an ester compound formed from an aliphatic carboxylic acid and an aliphatic alcohol. The "constituent of the wax compound" refers to an aliphatic carboxylic acid or an aliphatic alcohol (i.e., the starting materials for the wax compound) or an aliphatic carboxylic acid residue or an aliphatic alcohol residue. These components may be present in the polyester film of the present invention in the form of an ester compound of an aliphatic carboxylic acid and an aliphatic alcohol (i.e., a wax compound), in the forms of an aliphatic carboxylic acid and an aliphatic alcohol; or in a state where the components are bound via ester bonding to the carboxylic acid end group or the alcohol end group of the polyester. The components are preferably added in the form of a wax compound. With respect to the aliphatic carboxylic acid and the aliphatic alcohol, it is preferable to be present in the polyester film in a state where these are bound to the polyester in the fashion as stated above (i.e., in the forms of an aliphatic carboxylic acid residue and an aliphatic alcohol residue).

The film containing the wax compound according to the present invention is required to have large protuberances having maximum diameters of at least 2 μm at a density of not larger than 20 protuberances/mm$^2$, preferably not larger than 15 protuberances/mm$^2$. In a wax, particularly a natural wax, a solid material called a "foreign material" is usually contained in a large amount. Therefore, when such a wax is added as-is to a base material to form a film, large protuberances based oh the foreign material cause surface defects on the film, which is not desirable for use in a magnetic recording medium. For reducing the large protuberances, filtration of the source material of the foreign material (i.e., the wax compound) is effective. Specifically, filtration using a cartridge filter is desirable. The mesh size of the filter is preferably as small as possible, but may be determined appropriately taking the filtration rate which depends on the viscosity of the wax (i.e., productivity) into consideration, and is preferably not larger than 2 μm. Since a foreign material can be controlled in its source material, a synthetic wax is more preferable than a natural wax. It is also an important factor for the wax to exhibit a low filtration pressure during filtration. Hence, the wax preferably has up to 60, more preferably up to 50, of total carbon atoms. Still more preferably, the wax is one having 28 to 40 of total carbon atoms which is formed from an aliphatic carboxylic acid having 14 to 20 carbon atoms and an aliphatic alcohol having 14 to 20 carbon atoms. If the total number of the carbon atoms is less than 28, then the wax compound may be readily released out from the reaction during the process for adding the wax compound to the polyester, causing the reduction in residual ratio. Such a compound includes, for example, a synthetic wax of a fatty acid ester such as stearyl stearate, behenyl behenate, palmityl myristate and stearyl triglyceride, and especially preferably stearyl stearate and palmityl stearate.

As mentioned above, the wax compound formed from the aliphatic carboxylic acid and the aliphatic alcohol may be released out from the reaction system to some extent during the process for production of a polyester composition or during the process for processing into a film, depending on the process employed. Therefore, it is desirable that the wax compound exist in the polyester in such a state where the aliphatic carboxylic acid and the aliphatic alcohol are bound to the polyester termini through esterification reaction, from the viewpoint of improvement in residual rate of the wax compound in the reaction system.

The film according to the present invention contains 0.1 to 2.0% by weight, preferably 0.15 to 1.5% by weight, of the wax compound or constituent thereof. If the content of the wax compound or constituent thereof is smaller than 0.1% by weight, then satisfactory oligomer deposition preventing properties cannot be achieved. If the content is larger than 2.0% by weight, then the wax in itself may be bled out from the surface of the film, causing a problem of debonding of a deposited layer when a metal is evaporated on the surface or a problem of surface defects (e.g., dimples (defects)) which may be caused by the wax. When the case where the aliphatic carboxylic acid and the aliphatic alcohol exist in the polyester in the forms of an aliphatic carboxylic acid residue and an aliphatic alcohol residue bonded to the polyester termini through the esterification reaction the like, the contents of these residues are determined in terms of the amounts the aliphatic carboxylic acid and the aliphatic alcohol, respectively.

In the case where a single-layered film is formed using the polyester composition containing the wax compound or constituent thereof, if the film is intended to be used as a base film of a magnetic tape, the film has limitations on the surface design in view of affinity for a magnetic layer and a base coat layer and smoothness. Accordingly, the film preferably has a laminate structure having at least two layers, so that the surface design of the film become possible taking the difference between the side facing to the magnetic layer and the side facing to the base coat layer into consideration. By employing the laminate structure having at least two layers, the range of uses of the film may be increased depending on the types of the polymers used in each layer. Specific examples of the laminated polyester film include a two-layered polyester film having a layer A containing 0.1 to 2.0% by weight of the wax compound and a layer B containing no wax compound; and a multi-layered polyester film having at least three layers, in which a coating layer (a base coat layer) containing an agent which is easily adhesive to a magnetic material or a layer of the polyester is provided on the layer B of the above-mentioned film, and in which the wax compound is not contained in the outermost layers contain but in any inner layer at a concentration of 0.1 to 2.0% by weight; and so on. The constitution of the film is not limited to those described above, and any laminate structure and any wax content in each layer may be employed so as to form various types of films.

The film containing 0.1 to 2.0% by weight of the wax compound or constituent thereof may be manufactured as follows. A polyester composition containing 0.1 to 5.0% by weight of the wax compound or constituent thereof is previously prepared as a master chip. The master chip is diluted appropriately with other polyester to adjust the content of the wax compound or constituent thereof to a desired content, and then melt-extruded into a film. The content of the wax compound or constituent thereof in the master chip is preferably within the range from 0.1 to 4.0% by weight, more preferably from 0.2 to 3.0% by weight. If the content is smaller than 0.1% by weight, then satisfactory oligomer deposition preventing properties cannot be achieved. If the content is larger than 5.0% by weight, then heat resistance and productivity of the master polyester chip may be deteriorated.

The film preferably has a thermal treatment index of not larger than 60, more preferably not larger than 50. On the other hand, the film having a thermal treatment index of larger than 60 may cause deposition of an oligomer on its surface more easily as the storage period of the film becomes longer and, causing recording defects or clogging of a magnetic recording head when used in a magnetic recording medium.

In a magnetic tape, in addition to protuberances caused by a foreign material or an oligomer, formation of dimples (defects) (e.g., crater-shaped defects) is also a serious problem, because such defects may also cause the omission of data. Polyethylene glycol, a polyolefin, an organic sulfonic acid metal salt or the like may be used as an oligomer deposition preventing agent. However, polyester films containing the compounds may produce dimples (defects) thereon. The film containing the wax compound of the present invention produces few dimples (defects), in which dimples (defects) having maximum diameters of not smaller than 2 $\mu$m are contained at a density of up to 20 defects/mm$^2$, more preferably up to 15 defects/mm$^2$.

The film containing the wax compound according to the present invention preferably has a melt resistivity of less than 15×10$^7$ $\Omega$·cm, more preferably less than 10×10$^7$ $\Omega$·cm. If the melt resistivity is larger than 15×10$^7$ $\Omega$·cm, the electrostatic charge casting properties of the film become poor. As a result, air is likely to get into between the film and a casting drum during melt extrusion casting, and therefore the film forming speed must be reduced. The term "melt resistivity" as used herein refers to a value which is determined by measuring the amount of current passing through a polymer or a film in a molten state when a predetermined voltage is applied thereto and which serves as a measure of the electric conductivity of the polymer or film.

The compound oxide particle mainly comprising the compound of silicon dioxide and aluminum oxide according to the present invention can be synthesized from an alkali metal salt of silicon and an alkali metal salt of aluminic acid, for example, in a wet method using water as a solvent. The crystallinity of the compound oxide particle is not particularly limited, but is preferably amorphous since a spherical particle can be formed readily.

The ratio (on molar basis) of silicon element to aluminum element in the compound oxide particles should be 0.1 $\leq$ Al/Si $\leq$ 0.4, preferably 0.1 $\leq$ Al/Si $\leq$ 0.3, still more preferably 0.15 $\leq$ Al/Si $\leq$ 0.25. The amount of Potassium ions in ions of elements of group Ia of the periodic table in the inorganic narticles should be in the range of 80 to 100%. The lower limit of the range is more preferably not smaller than 85%, still more preferably not smaller than 90%. The upper limit of the range is most preferably 100%, but an upper limit of about 99% is practical from the viewpoint of productivity. The ratio (on molar basis) of ions of elements in group Ia of the periodic table to aluminum element should be 0.8 $\leq$ [ions of elements in group Ia of the periodic table]/Al $\leq$ 1.2. The lower limit of the range is preferably not smaller than 0.9, more preferably not smaller At than 0.95. The upper limit of the range is preferably not larger than 1.1, more preferably not larger than 1.05. By adjusting the ratios within the ranges, the particles can have good heat resistance and dispersibility, as well as better friction properties, abrasion resistance and running ability. The reason for these effects is still unclear, but is considered as follows. In the compound oxide, a part of the aluminic acid components together with ions together monovalent ions form salts. Therefore, the electrical double layer and the electrostatic effects contribute to dispersibility, and the surface activity contributes to heat resistance and so on of the particles. In these mechanisms, the contribution of the content of the aluminum component and its counter ion should be taken into consideration. Among various ion species, potassium ion is considered to act effectively.

The compound oxide particles preferably have a mean particle size of 0.01 to 10 $\mu$m. If the mean particle size is smaller than 0.01 $\mu$m, then the sliding properties of the surface of the film are insufficient. If the mean particle size is larger than 10 $\mu$m, then the abrasion resistance of the film becomes not only poor, but also large protuberances may formed, leading to undesirable properties for use in a magnetic recording medium, such as drop-out. The more preferable range of the mean particle size may vary depending on the intended use. However, the lower limit is more preferably not smaller than 0.03 $\mu$m, especially preferably not smaller than 0.05 $\mu$m. The upper limit is more preferably not larger than 5 $\mu$m, especially preferably not larger than 2 $\mu$m.

The content of the compound oxide particles in the polyester composition is within the range from 0.005 to 5% by weight, preferably from 0.01 to 3% by weight, more preferably from 0.05 to 2% by weight. If the content of the particles is smaller than 0.005% by weight or larger than 5% by weight, then a film cannot be formed which combines various good properties such as sliding properties, friction properties, abrasion resistance and heat resistance.

The compound oxide particles may be produced by water glass method or from an ester or a halide. For example, a solution of a silicic acid alkali metal salt and an aluminic acid alkali metal salt is introduced to a previously prepared alkaline solution containing an ultrafine nucleating agent to make grow nucleus, or alternatively a metal alkoxide is hydrolyzed, thereby producing the particles.

In the present invention, the percentage of the compound oxide particles having particle sizes four or more times the mean particle size is up to 1%, more preferably up to 0.5%. Still more preferably, such particles are not detected as the component. The "percent" or "%" used herein means a number percentage. Because of containing few or no such large particles, running ability and abrasion resistance can be improved and, when the particles are used in a magnetic recording medium, good magnetic recording properties can be provided.

With respect to particle size distribution of the compound oxide particles, it is preferable that the particles having particle sizes of the mean particle size ±20% comprise at least 60%, more preferably at least 65%, still more preferably at least 70%, of the total particles. The upper limit is not particularly limited, but about 90% is practical. By adjusting the particle distribution within the range, good running ability and abrasion resistance can be provided.

For controlling the particle size and the particle distribution, a method is advantageously employed in which previously produced seed particles are added and used as nucleus (cores) to grow the particles around the nucleus, for example. In the method, it is advantageous to properly adjust the temperature, concentration, pH and so on to control the growth conditions.

The concentrations of elements in the particles is preferably controlled by adjusting the ionic components to be added as the starting components or using an ion exchange resin.

The polyester composition containing the compound oxide particles according to the present invention preferably satisfies the following equations:

$$L-b \geq 45; \text{ and } a \leq 1.5$$

wherein L, a and b represent L value, a value and b value determined as Hunter's values according to JIS L-1073, respectively. Normal polyethylene terephthalate is colorless, but its color tone may be changed by various other components contained therein. This mechanism is complex and the entire of the mechanism is not yet clear. One of the typical causes is considered to be thermal decomposition by particles having active surfaces. In the present invention, by adjusting the color tone range to that satisfying the above equations, a limitation in uses imposed by the coloration can be eliminated, good dispersibility can be provided, and running ability, abrasion resistance, heat resistance and abrasion resistance can be improved. The L–b value is more preferably at least 48, still more preferably at least 50. The upper limit is not particularly limited, but about 65 or lower is practical from the viewpoints of productivity and so on. The b value is preferably up to 12, more preferably up to 10. The lower limit is not particularly limited. However, since use of a coloring component is not necessarily needed in the present invention, the lower limit of about 0 or more is practical from the viewpoints of productivity and so on. The a value is preferably up to 1.0, more preferably up to 0.5, especially preferably a negative value. The lower limit is not particularly limited. However, since use of a coloring component is not necessarily needed in the present invention, the lower limit of about –5.0 or larger is practical from the viewpoints of productivity and so on.

In the polyester composition containing the compound oxide particles according to the present invention, slipping properties and friction properties can be more improved by the addition of the wax compound formed from the aliphatic carboxylic acid and the aliphatic alcohol or the constituent thereof.

The reason why the good effects of the present invention as stated above can be produced remains uncertain, but is considered as follows. The wax compound or constituent thereof are attached onto the surfaces of the particles to further improve the properties of the particle surfaces and improve the adhesion of the particle surfaces to the matrix resin, and are also finely dispersed in the matrix to improve running ability and friction properties.

In the polyester containing the compound oxide, it is preferable to satisfy the following equation:

$$0.3 \leq (Ma/2+Mb)/P \leq 3.0$$

wherein Ma represents a concentration (mol/kg) of alkali metal ions, Mb represents a concentration (mol/kg) of alkaline earth metal ions and P is a concentration (mol/kg) of phosphorus, in the polyester matrix without the compound oxide (hereinafter, "Ma/2+Mb" is simply referred to as "M"). If the M/P is smaller than 0.3, then the film formed from the composition cannot have good color tone and an adverse effect on productivity may occur. If the M/P is larger than 3.0, then a film having good color tone is hardly obtained and heat resistance may be reduced.

The metal element may be added to the composition, for example, by adding to or blending with the reaction system upon the production of the polyester, a compound containing an alkali metal (e.g., lithium, sodium, potassium), an alkaline earth metal (e.g., magnesium, calcium) or a metal (e.g., zinc, manganese, zinc), specifically a glycol-soluble salt compound of a monocarboxylic acid (e.g., lithium acetate, calcium acetate, magnesium acetate, manganese acetate) or a chloride (e.g., lithium chloride, manganese chloride), as a reaction catalyst/additive.

The addition of phosphorus element is performed, for example, by adding to/blending with the reaction system upon the production of the polyester, a compound containing phosphorus element, such as phosphoric acid, phosphorous acid, phosphonic acid or an ester thereof.

The film containing the compound oxide particles according to the present invention may be a single-layered film, but preferably a multilayered or laminated film having at least one film layer (layer A) comprising the polyester composition containing the compound oxide particles, from the viewpoints of abrasion resistance and electrical properties. The gauge of the layer A is not particularly limited, but is preferably 0.01 to 3 $\mu$m, more preferably 0.05 to 2 $\mu$m, still more preferably 0.1 to 1.5 $\mu$m, especially preferably 0.1 to 1 $\mu$m, from the viewpoints of abrasion resistance and electrical properties. The layer A is preferably provided as at least one layer in the outermost layers, so that good slipping properties, abrasion resistance, processibility and impact resistance can be attained and properties as a film can be exerted more effectively. When the film has a multilayered structure, the concentration requirements is applied to each layer and may be satisfied in any one of the layers.

In the layer A of the multilayered film, the relationship between the gauge t ($\mu$m) and the mean particle size d ($\mu$m) of the compound oxide particles contained therein preferably satisfies the equation: $0.2d \leq t \leq 10d$, more preferably $0.3d \leq t \leq 5d$, still more preferably $0.5d \leq t \leq 3d$, so that the above-described properties can be improved more satisfactorily.

It is preferable to contain inert particles other than the compound oxide particles, such as inorganic particles of titanium dioxide, silicon dioxide (e.g., colloidal silica), aluminum oxide, calcium carbonate, aluminum silicate or the like or organic particles comprising, as a constituent, acrylic acid, styrene or the like. The inert particles preferably have a mean particle size of 0.01 to 10 $\mu$m and is preferably contained at a concentration of 0.001 to 5% by weight, so that a film having good slipping properties and abrasion resistance and the process passage properties particularly during the production or processing of the film. The mean particle size of the inert particles is preferably either 1.5 to 5 times or 0.2 to 0.67 time, more preferably either 2 to 4 times or 0.25 to 0.5 time the mean particle size of the compound oxide particles. When the mean particle size is 1.5 to 5 times, the roll formation, process passage properties and slipping properties can be improved in a large degree. When the mean particle size is 0.2 to 0.67 time, good electromagnetic conversion properties as a magnetic recording medium can be provided and running ability and abrasion resistance can be improved.

With respect to the surface properties, the film according to the present invention preferably has a three dimensional roughness SRa of 5 to 30 nm and a three dimensional roughness SRz of 100 to 500 nm, and has the number of protuberances on the surface of $1\times10^3$ to $1\times10^8$ protuberances/mm$^2$. The lower limit of the SRa is more preferably at least 10 nm, still more preferably at least 15 nm. The upper limit of the SRa is more preferably up to 25 nm, still more preferably up to 20 nm. The lower limit of the SRz is more preferably at least 200 nm, still more preferably at least 250 nm. The upper limit of the SRz is more preferably up to 400 nm. still more preferably up to 350 nm. The lower limit of the number of protuberances is more preferably at least $1\times10^4$ protuberances/mm$^2$, still more preferably at least $3\times10^4$ protuberances/mm$^2$. The upper limit of the number of protuberances is more preferably up to $1\times10^5$ protuberances/mm$^2$. By adjusting the surface properties within the ranges, the film can have good running ability and abrasion resistance, and a magnetic recording medium using the film can have a high reliability in which a magnetic layer is hardly affected by the profile transfer in a rolled form (e.g., with less drop-outs).

The polyester film according to the present invention preferably has a rate of change in dynamic friction coefficient after 50-time repeated running [$\mu k(50)$] of not larger than 30%. If the rate is larger than 30%, then the falling off of the particles or the like occurs to produce powdery materials which may cause recording defect when used in a magnetic recording medium.

The film according to the present invention preferably has a gauge variation in the entire film gauge of up to 20%, more preferably up to 14%, still more preferably up to 10%. As a matter of course, it is ideal for the film to have no gauge variation, but the lower limit of the gauge variation is about 0.1% in actuality. If the gauge variation is larger than 20%, electrical properties are adversely affected when the film is used in a condenser, or the extensibility relative to tension is adversely affected and evenness is reduced when the film is used in a magnetic recording medium.

The polyester composition and film according to the present invention may contain other thermoplastic resin (e.g., polyethylene, polypropylene, polystyrene) and various additives such as an end-capping agent (e.g., carbodiimide, an epoxy compound), an ultraviolet absorber, an antioxidant, an antistatic agent, a surfactant a pigment, a fluorescent whitening agent.

The polyester used in the present invention preferably formed from a dicarboxylic acid component and a glycol component and may be produced, for example, by esterification or transesterification of a dicarboxylic acid or an ester-forming derivative thereof with glycol followed by polycondensation.

The type of the polyester is not particularly limited as long as it is moldable into an article such as a film. The suitable polyester which is moldable into an article such as a film includes those in which an aromatic dicarboxylic acid is used as the dicarboxylic acid component, such as polyethylene terephthalate, polyethylene-p-oxybenzoate, polyethylene-1,2-bis(2-chlorophenoxy)ethane-4,4'-dicarboxylate, polyethylene-1,2-bis(phenoxy)ethane-4,4'-dicarboxylate, polyethylene-2,6-naphthalenedicarboxylate, polybutylene terephthalate and polycyclohexane-1,4-dimethylene terephthalate, and preferably polyethylene terephthalate, polyethylene-2,6-naphthalenedicarboxylate, polybutylene terephthalate and poly-1,3-trimethylene terephthalate, and copolymers or blends thereof.

The co-esterification component of the copolyester may be an acid component (e.g., an aromatic dicarboxylic acid, an aliphatic dicarboxylic acid, an alicyclic dicarboxylic acid) and a glycol component (e.g., an aromatic glycol, an aliphatic glycol, an alicyclic glycol) other than the acid component and the glycol component which are constituents of the polyester. The acid component includes, for example, an aromatic dicarboxylic acid such as telephthalic acid, isophthalic acid, naphthalenedicarboxylic acid, phthalic acid, diphenyldicarboxylic acid, diphenyletherdicarboxylic acid, diphenoxyethanedicarboxylic acid and sodium-5-sulfoisophthalate acid; an aliphatic dicarboxylic acid such as oxalic acid, succinic acid, adipic acid, sebacic acid, dimer acid, maleic acid and fumaric acid; an alicyclic dicarboxylic acid such as 1,4-cyclohexanedicarboxylic acid and decalindicarboxylic acid.

The glycol component includes an aliphatic glycol such as ethylene glycol, 1,3-trimethylene glycol, 1,4-butanediol, 1,5-pentanediol, neopenthyl glycol, diethylene glycol, 1,6-hexanediol and 1,10-decanediol; and an alicyclic glycol such as 1,2-cyclihexane dimethanol, 1,4-cyclohexane dimethanol and hydrated bisphenol A. Among these glycol components, ethylene glycol, 1,3-trimethylene glycol, 1,4-butanediol and 1,4-cyclohexane dimethanol are preferably used.

The acid component and glycol component may be used singly or in combination of two or more of them. These coesterification components may be by-products of the production process for the polyester.

With respect to the esterification catalyst, it is preferable not to use those catalysts which may produce a metallic foreign material by the reduction thereof or, if used, in an amount as small as possible. For example, diantimony trioxide (a known catalyst) anda titanium compound are undesirable, because they are reduced during the reaction to readily produce metallic foreign materials. Therefore, in the production of the polyester film of the present invention, the raw materials are preferably polymerized in part with germanium oxide or antimony oxide having a low bismuth content, and more preferably all of the raw materials are polymerized with germanium oxide. Germanium oxide is desirable, because it produces no metallic foreign material by the reduction thereof during the reaction process.

The polyester composition according to the present invention canbe produced according to a conventional process for production of a polyester.

For example, a dialkyl ester (an acid component) and a diol component are subjected to transesterification reaction. The reaction product is heated under reduced pressure to be polycondensed while removing the excess diol component. Thus, the polyester composition can be obtained. Alternatively, a dicarboxylic acid may be used as an acid component and subjected to conventional direct esterification, thereby producing the polyester composition.

The wax compound formed from an aliphatic carboxylic acid and an aliphatic alcohol or the compound oxide particles can be incorporated into the polyester resin by any method. For example, these components may be added to the resin before or during the esterification or may be poured in the form of a slurry into a single or twin-screw extruder equipped with a vent port. However, it is preferable to add these components during the esterification, because this enables to achieve the present invention readily. In the addition of the wax compound, it is preferable that the wax compound be finely dispersed in the polyester by kneading over a sufficient time, or be bound to the polyester, so that the flying off of the wax compound can be prevented during the addition to the polyester composition or in the process for processing the polyester composition into a film. An exemplary method for addition of the wax compound during the esterification is as follows. At the final stage of the polycondensation, the pressure in the reaction system is elevated to ordinary pressure, and the wax compound is then added. After the reaction mixture was stirred for 5 minutes, the pressure in the reaction system is reduced again, and re-esterification is performed under reduced pressure. In this case, for achieving well dispersion or binding of the wax compound in or to the polyester, the time for the re-esterification is preferably longer, more preferably at least 30 minutes, still more preferably at least 60 minutes. However, if the time for the re-esterification is too long, reduction in the productivity or thermal decomposition of the polyester may occur. Accordingly, the time for the re-esterification is preferably up to 120 minutes. The intrinsic viscosity of the polyester at the time of addition of the wax compound is preferably at least 0.60, from the viewpoint of reduction in the molecular weight of the polyester upon the addition of the wax compound. If the intrinsic viscosity of the polyester is too high, then the dispersibility of the wax compound or the binding between the wax compound and the polyester may be decreased. Accordingly, the intrinsic viscosity of the polyester at the time of addition of the wax compound is preferably not higher than 0.75.

The slurry of the compound oxide particle is preferably prepared in the form of an alkylene glycol slurry. The slurry can be prepared, for example, by solvent replacement of an aqueous slurry. In the solvent replacement, application of too high heat strength is not preferable, because the surfaces of the inorganic particles are activated. For the purpose of the present invention, it is preferable to adjust the final concentration of the ammonium component in the alkylene glycol slurry to 0.01% by weight or lower, preferably 50 ppm or lower. The slurry is preferably adjusted to a pH within the range from neutral to alkaline pH values.

In the case where a product containing both the compound oxide particles and the wax compound is to be produced, it is preferable to prepare two thermoplastic polyesters each containing either of the components as master chips and then blend the master chips to each other appropriately, thereby producing the final product. This is suitable for producing a variety of types of products.

The polyester composition according to the present invention thus produced may be molded by any known method. A specific example of the method for producing a film using the polyester composition is as follows. The polyester composition is dried and then meld-extruded to form an unstretched sheet. The unstretched sheet is subjected to biaxial stretching and heat treatment, thereby producing the film. The biaxial stretching may be longitudinal/lateral sequential biaxial stretching or simultaneous biaxial stretching. The stretch magnification is generally 2.0 to 5.0 times in each of the longitudinal and transverse directions. After the biaxial stretching, the resulting film may be re-stretched in either longitudinal or transverse direction. In this case, the polyester composition of the present invention may be blended with different polyester to modify the contents of the wax compound and the compound oxide depending on the intended use. The different polyester to be blended may be the same as or different from the base polyester of the polyester composition of the present invention. In the case where a multilayered film is to be formed, for example, the materials for individual layers are melt-extruded from a dye of a feed block having a rectangular lamination portion for laminating two or more layers such that there layers can be laminated at the intended gauge ratio and the intended to produce an unstretched sheet. The unstretched sheet is subjected to biaxial stretching and heat treatment as in the case of a single-layered film to obtain the multilayered film.

The film according to the present invention can be suitably used in a magnetic recording medium. The recording mode of the magnetic recording medium may be any type, including known longitudinal magnetic recording, perpendicular magnetic recording and optical magnetic recording. The type of the source material for the magnetic material (i.e., a metal or metal compound) is not particularly limited as long as it can form a known ferromagnetic layer containing, for example, iron, cobalt, nickel, chromium or an oxide or alloy thereof. The method for forming a magnetic thin film may be a vacuum thin film formation technique such as plating, vacuum deposition, spattering and ion plating; or a wet process in which ferromagnetic powder is applied, as a magnetic coating, together with a binder comprising a vinyl chloride/vinyl acetate/vinyl alcohol copolymer, a polyurethane prepolymer or a polyisocyanate. In this case, the binder is preferably a thermosetting resin type or radiation-setting resin type of binder. Other additive, such as a dispersing agent, a lubricant and an antistatic agent, may be added.

In the present invention, the method for forming the magnetic layer is not particularly limited. Since the film according to the present invention has good surface properties, transfer of the surface profile hardly occurs and the sliding properties and abrasion resistance are good. Therefore, the film is particularly useful in the formation of a metal thin film type of magnetic layer which has a gauge far thinner than a coating type of magnetic layer and in which satisfactory surface properties are severely required in both the front and rear surfaces. In this case, it is preferable to provide a non-magnetic thin film layer (e.g., a base coat layer) onto the base film to improve the surface properties of the base film, such as the improvement of adhesion to the magnetic layer and the formation of desired crystalline. To further improve the adhesion to the magnetic layer or the like, the surface of the film may be previously treated by irradiation of ultraviolet ray or radioactive ray, electrical discharge or the like.

The metallic thin film type of magnetic layer may be made from, for example, a metal alone (e.g., Co, Fe, Ni) or an alloy thereof, an alloy of the metal or alloy with other metal (e.g., Cr, Mo, W, V, Nb, Ti, Rh, Ru), or an oxide of the metal or alloy. If required, the same or different magnetic layers may be additionally laminated. It is preferable to provide a protective layer or a lubricating layer on the magnetic layer.

Thereafter, on the side opposite to the magnetic layer, a base coat layer may be provided by any known method to further improve the running ability.

Hereinbelow, methods for determining and evaluating the properties employed in the present invention will be described.

(A) Properties of Polymer (A-1) Intrinsic Viscosity of Polymer ([η]):

Measured in the solvent o-chlorophenol at 25° C.

(A-2) Color tone of polymer (L, a, b values):

Determined according to JIS L-1073.

(A-3) Particle Dispersibility in Polyester Composition

The particle dispersibility was determined by observation of a polyester composition under a transmission electron microscope and ranked as follows.

○: no flocculated particle or large particle was observed;

Δ: flocculated particles or large particles were slightly observed; and x: flocculated particles or large particles were abundantly observed.

(A-4) Elemental Analysis of Polyester Composition

Analyzed by fluorescent X-ray method.

(B) Properties of Film (B-1) Three-dimensional Surface Roughness of Film

The three-dimensional surface roughness was measured using a microstructure surface roughness meter (ET-30HK) available from Kosaka Kenkyujo. An optically touching needle (HIPOSS; a trade name) was used for detection and the measuring was conducted after the surface of a test piece was deposited with aluminum under vacuo. Detail measurement conditions were as follows.

Measurement length in the length-wise direction: 0.5 mm

Measurement length in the width-wise direction: 2.0 mm

Cut off: 0.08 mm (B-2) Gauge Variation of Film

The gauge of each of at least 500 points arbitrary sampled from a film roll was measured and the gauge variation was determined according to the following equation.

(Max. gauge−Min. gauge)/(mean gauge)×100 (%)

(B-3) Laminate Gauge of Film

The distribution of particle density in a depth-wise direction was determined by secondary ion mass spectrometry, X-ray photoelectric spectroscopy or infrared spectroscopy or using a confocal microscope. After the particle density in a depth-wise direction reached a maximum value relative to a value on the surface, a depth which was one-half the maximum value was defined as a laminate gauge. When the laminate gauge is small, a laminate gauge can also be determined by observation of the cross section of a film or using a thin film level difference measuring apparatus or the like, rather than from the depth distribution of the particle density.

(B-4) Rate of change of dynamic friction coefficient of film

Using a dynamic friction coefficient measuring apparatus (TBT-300; available from YOKOHAMA SYSTEM RESEARCH), a tape roll which had been prepared by slitting a film in a width of ½ inch was set in the apparatus, and then run at a speed of 3.3 cm/sec. while making the surface of which the outermost layer was made from the composition of the present invention contact with a post (SDS 420J2; outer diameter: 8 mmφ; surface roughness: 0.2S) at a winding angle of 180 degree at 25° C. in an atmosphere of 50% RH. The inlet tension (T1) was controlled to become 25 g, and the outlet tension (T2) was measured after repeating the procedure for 50 times. The dynamic friction coefficient was determined according to the following equation:

$\mu k=(2/n)\ln(T2/T1)$.

The rate of change of dynamic friction coefficient [$\mu k(50)$] was defined as follows:

$\mu k(50)=[\mu k50-\mu k1]/\mu k1 \times 100$ wherein "$\mu k1$" represents a dynamic friction coefficient determined after 1 pass and "$\mu k50$" represents a dynamic friction coefficient determined after 50 passes.

(B-5) Abrasion resistance of film

A tape roll of ½ inch width, which was prepared by slitting a film, was run while making it contact with a stainless SUS-304 guide roll under a constant tension. Abrasion resistance was ranked based on the amount of white powder produced on the surface of the guide roll as follows:

⊚: production of white powder was not observed;

○: production of white powder was slightly observed;

Δ: production of white powder was slightly abundantly observed; and x: production of white powder was significantly observed.

(B-6) Scratch resistance of film

A film was slitted into a tape of ½ width and 10 tapes were provided. Each of the tapes was set in a tape running tester and was run on a guide pin (surface roughness Ra: 100 nm) (running speed: 300 m/min., time of running: once, winding angle: 60°, running tension: 60 g). Scratches formed on the film during the running was observed under a microscope to determine the scratch resistance of the film. The scratch resistance was ranked based on the average number of scratches with a width of not smaller than 2.5 $\mu$m formed on the film during the running per tape width as follows: less than 2 scratches: ⊚; not smaller than 2 and not greater than 5 scratches: ○; not smaller than 5 and not greater than 10 scratches: Δ; and not smaller than 10 scratches: x.

(B-7) Drop-out properties

On the side containing no particle of a film according to the present invention, the coating containing a water-soluble polyester and cross-inked silicone into which colloidal silica with a particle size of 20 nm was dispersed was applied. On the coated surface, a cobalt deposition layer was formed in the presence of a trace amount of oxygen using a continuous vacuum deposition apparatus. A diamond-like carbon thin film was formed on the cobalt deposition layer, and a fluoride-containing lubricating agent layer was additionally formed thereon. On the lubricating agent layer, a back coat layer mainly comprising urethane resin, an abrasive and carbon black was formed. The film thus formed was slitted into a tape with a width of 8 mm. The tape was set in a cassette to prepare a cassette tape. A signal of 4 MHz was supplied from a TV testing wave generator. The number of drop-outs having the attenuation in regenerated signal of not smaller than −16 dB and a length of not smaller than 15 $\mu$sec was counted using a drop-out counter. The program of regeneration (3 min.)/re-winding was repeated 100 times at 25° C. and 60% RH. The number of drop-outs generated during the repeated program was counted, and a mean number of drop-outs per 1 min. was determined. A product is defined as "better" as the number of drop-outs is fewer. The threshold value may vary depending on the intended use, but a value not larger than 30 drop-outs/min. is one measure.

(B-8) Large Protuberances on the Surface of Film (Also for the Number of Dimples (Defects))

The surface of a film was deposited with aluminum and observed under a running interference microscope at an overall magnitude of 100 times. The total number of large protuberances or dimples (defects) with maximum sizes of not smaller than 0.2 mm was counted and converted to the number per 1 mm$^2$.

(B-9) Determination of Melt Resistivity

A pair of copper plates were used as electrode plates. A Teflon spacer was sandwiched between the copper plates to prepare an electrode ((copper plates: 22 cm$^2$, space between the copper plates: 9 mm). The electrode was embedded in a film polymer which had been molted at 290° C. The amount of current produced by applying a voltage of 5,000 V to the electrode was measured and a resistance value was calculated based on the amount of current.

(B-10) Film Forming Ability

Irregularity of electrostatic charge applied during the film casting was observed under the condition of the casting rate of 8 m/min, and ranked as follows:

A: no irregularity occurred;

B: irregularity occurred occasionally; and

C: irregularity occurred constantly.

(B-11) Thermal Treatment Index of Film

A film (b) of which thermal treatment index was to be determined and a film (a) which had the same structural characteristics including film gauge, laminate structure and laminate gauge, as those of the film (b) except that no wax component was contained were provided.

Each of the films was allowed to stand in an oven at 150° C. for 30 min. to force a low molecular weight material (e.g., an oligomer) to deposit on the surface of the film, and the film surface was deposited with aluminum. Ten fields on the surface of the film were observed under a running interference microscope at a magnitude of 400 times. The number of the clusters of the low molecular weight material (e.g., an oligomer) in each field was counted, and the total number was converted to the number of the surface-deposited oligomers (oligomers/mm$^2$). The thermal treatment index was calculated according to the following equation:

thermal treatment index=B/A×100 wherein A represents the number of the clusters of an oligomer deposited on the film (a), and B represents the number of the clusters of an oligomer deposited on the film (b).

(C) Properties of Particles (C-1) Mean Particle Size and Particle Distribution of Particles A polyester composition or a cross section of a film prepared using the composition was observed under a transmission electron microscope (TEM) at a magnitude of 10,000 times or higher. The gauge of a section used for the observation under TEM was about 100 nm, and 100 different fields on the section were observed. A mean particle size d of particles was determined based on a weight average particle size (expressed in terms of circles).

(C-2) Chemical Composition of Particles

The chemical composition of particles was determined by the fluorescent X-ray method.

EXAMPLES

Hereinbelow, the present invention will be illustrated with reference to the following examples. However, it should be understood that the invention is not limited to the specific details set forth in the examples.

Preparation of Compound Oxide Particles:

Solutions each containing either sodium silicate or sodium aluminate were simultaneously introduced to an alkaline aqueous solution containing seed particles (particle size: 20 nm) which were previously prepared to have the same composition as the intended composition but substantially containing no ammonium component, and particles were made grown around the seeds, thereby producing compound oxide particles. The X-ray diffraction of the resultant particles revealed that the particles were amorphous.

An aqueous slurry of the particles which had been grown to the intended particle size was subjected to ultrafiltration in an aqueous potassium chloride solution using an ultrafilter membrane to replace sodium elements in the compound oxide particles with potassium elements, and then the undesirable ions were removed.

The aqueous slurry thus prepared was added with ethylene glycol, and then heated to remove water therefrom. This procedure was repeated to replace the solvent, thereby preparing an ethylene glycol slurry of the compound oxide particles.

Preparation of Polyester Resin S:

Dimethyl terephthalate (100 parts by weight) and ethylene glycol (70 parts by weight) were subjected to transesterification reaction in a conventional manner using magnesium acetate tetrahydrate (0.05 part by weight) as a catalyst. After the transesterification reaction was completed, germanium oxide (0.03 part by weight) and trimethyl phosphate (a phosphorous compound; 0.02 part by weight) were added to the resulting solution, and an ethylene glycol slurry of monodisperse colloidal silica particles (mean particle size: 0.3 μm) was added thereto so that the content of the particles became 1 part by weight. Subsequently, the resultant solution was subjected to polycondensation reaction in a conventional manner, thereby producing a polyester composition having an intrinsic viscosity of 0.62 dl/g.

Preparation of Polyester Resin P:

The same procedure as that for production of polyester resin S was performed, except that particles of cross-linked polystyrene (see Table 2) were used, thereby producing a polyester composition having an intrinsic viscosity of 0.62 dl/g.

Preparation of Polyester Resin D Containing Lithium Dodecylbenzenesulfonate:

A mixture of dimethyl terephthalate (100 parts by weight) and ethylene glycol (60 parts by weight) was added with magnesium acetate hydrate (0.05% by weight based on the weight of dimethyl terephthalate), and then heated to perform transesterification reaction in a conventional manner. Subsequently, the transesterification reaction product was added with trimethyl phosphate (0.02% by weight based on the weight of dimethyl terephthalate) and further added with germanium acetate (0.02% by weight). To the resultant mixed solution were added lithium dodecylbenzenesulfonate (DBS-Li) (5% by weight based on the weight of dimethyl terephthalate), silicone oil (as a deforming agent; 0.20% by weight). The resultant mixed solution was transferred onto a polycondensation reaction layer. The pressure in the reaction system was gradually reduced while heating and esterification was performed at a reduced pressure of 1 mmHg at 290° C. in a conventional manner, thereby producing a polyester composition having an intrinsic viscosity [η] of 0.62.

Preparation of Polyester Resin X:

The same procedure as that for production of polyester resin S was performed, except that no particle was added, thereby producing a polyester composition having an intrinsic viscosity of 0.62 dl/g.

Preparation of Polyester resins W1 to W5:

A mixture of dimethyl terephthalate (100 parts by weight) and ethylene glycol (60 parts by weight) was added with magnesium acetate tetrahydrate (0.05% by weight based on the weight of dimethyl terephthalate), and then heated to perform transesterification reaction in a conventional manner. Subsequently, the transesterification reaction product was added with trimethyl phosphate (0.020% by weight based on the weight of dimethyl terephthalate) and further added with germanium oxide (0.02% by weight). The resultant mixed solution was transferred onto a polycondensation reaction layer. The pressure in the reaction system was gradually reduced while heating and esterification was performed at a reduced pressure of 1 mmHg at 290° C. in a conventional manner until the esterification degree was increased to that corresponding to an intrinsic viscosity [η] of 0.62. At this point of time, the pressure in the reaction system was elevated to the ordinary pressure. To the reaction system was added stearyl stearate (2% by weight) which had been filtered through a cartridge filter (2 μm mesh). The pressure in the reaction system was reduced again and then the reaction product was delivered at a predetermined torque, thereby producing a polyester composition (W1) having an intrinsic viscosity [η] of 0.58. The same procedure was repeated except that each of myristyl stearate, palmityl stearate, behenyl behenate and carnauba wax was used in place of stearyl stearate, thereby producingpolyester resins W2, W3, W4 and W5.

Example 1

The polyesters prepared as described above were well dried. The polyester resins W1 and S were dry-blended with the polyester resin X so that the concentrations of the wax compound and colloidal silica based on the total amount of the polymers became 0.5% by weight and 0.6% by weight, respectively. The resin blend was charged in an extruder for a sub-layer and the resin X was charged in an extruder for a main layer, and then extruded through a T-shaped die into a sheet. The sheet was solidified on a cooling drum at 30° C. while applying a static charge to produce an unstretched film. The unstretched film was heated to 95° C. and stretched in a longitudinal direction at a stretch magnification of 3.5 times, and then further heated to 100° C. and stretched in a lateral direction at a stretch magnification of 3.6 times. The resultant film was heat-treated at 200° C., thereby forming a film of 7 μm thick. The film forming ability was good. The film thus produced had few large protuberances and dimples (defects) and showed a low thermal treatment index and good oligomer deposition preventing properties. The results are shown in Table 1.

Examples 2–9

The same procedure as in Example 1 was conducted, except that the polyester resins W1, X and S were blended so that the concentrations of the wax compound in the sub-layer and the main layer adjusted to those shown in the table and then charged in extruders, thereby producing laminated polyester films. The results are shown in Table 1.

Examples 10, 11

The same procedure as in Example 1 was conducted, except that each of the polyester resins W4 and W2 was used in place of the polyester resin W1, thereby producing polyester films. As shown in the table, the films had good film forming ability, had few large protuberances and dimples (defects), and showed good oligomer deposition preventing properties.

Comparative Example 1

The same procedure as in Example 1 was conducted, except that the polyester resin W1 for the sub-layer was not supplied, thereby producing a film. Although having no problems in film forming ability and surface defects, the film had a thermal treatment index of about 100 and showed no oligomer deposition preventing properties.

Comparative Examples 2, 3

The same procedure as in Example 1 was conducted, except that the concentration of the wax compound in the sub-layer was 0.05% by weight, thereby producing films. The films showed unsatisfactory oligomer deposition preventing properties.

Comparative Examples 4, 5

The same procedure as in Example 10 was conducted, except that the polymers were supplied so that the concentration of the wax compound in each layer became that shown in the table, thereby producing films. The films had many large protuberances and dimples (defects), and therefore were not suitable as magnetic recording materials.

Comparative Example 6

The same procedure as in Example 1 was conducted, except that the polyester resin D was used in place of the polyester resin W1, thereby producing a film. The irregularity in electrostatic charge constantly occurred during the film formation, and break in the film occurred frequently during the stretching.

Comparative Example 7

The same procedure as in Example 1 was conducted, except that the polyester resin W5 was supplied so that the content of carnauba wax in the sub-layer became 0.5% by weight, thereby producing a film. The film had a very large number of large protuberances on the surface.

Comparative Example 8

The same procedure as in Example 1 was conducted, except that polypropylene (M.W. 5,000) was supplied so that the concentration thereof in the sub-layer became 0.5% by weight, thereby producing a film. The film had a very large number of dimples (defects) and showed unsatisfactory oligomer deposition preventing properties.

Example 13

Dimethyl terephthalate (100 parts by weight) and ethylene glycol (70 parts by weight) were subjected to transesterification reaction in a conventional manner using magnesium acetate tetrahydrate (0.05 part by weight) as a catalyst. After the transesterification reaction was completed, stearic acid (0.8 part by weight) and stearyl alcohol (1.2 parts by weight) were added to the reaction mixture and then stirred for 5 minutes. To the resultant were added germanium oxide (0.03 part by weight) and trimethyl phosphate (as a phosphorus compound; 0.02 part by weight). Subsequently, the resultant mixture was subjected to polycondensation reaction in a conventional manner, thereby producing a polyester composition (polyester resin W6) having an intrinsic viscosity of 0.62 dl/g.

The same procedure as in Example 1 was conducted, except that W6 was used, in place of W1, so that the concentrations of stearic acid and stearyl alcohol in a film became those shown in the table, thereby producing a film. The results are shown in Table 1.

Example 14

Dimethyl terephthalate (100 parts by weight) and ethylene glycol (70 parts by weight) were subjected to transesterification reaction in a conventional manner using magnesium acetate tetrahydrate (0.05 part by weight) as a catalyst. After the transesterification reaction was completed, germanium oxide (0.03 part by weight) and trimethyl phosphate (as a phosphorus compound; 0.02 part by weight) were added to the reaction mixture. An ethylene glycol slurry of the compound oxide particles, which was previously prepared, was further added to the reaction mixture so that the content of the particles became 1 part by weight. Subsequently, the resultant mixture was subjected to polycondensation reaction in a conventional manner, thereby producing a polyester composition (polyester resin A1) having an intrinsic viscosity of 0.62 dl/g. The properties of the polyester composition are shown in Table 2.

The polyester was well dried. The polyester resins A1, P and X were blended so that the content of the particles and lamination gauge shown in Table 3 were achieved. The resin blend was charged in an extruder for a sub-layer and the resin X was charged in an extruder for a main layer, and then extruded through a T-shaped die into a sheet. The sheet was solidified on a cooling drum at 30° C. while applying a static charge to produce an unstretched film. The unstretched film was heated to 95° C. and stretched in a longitudinal direction at a stretch magnification of 3.5 times, and then further heated to 100° C. and stretched in a lateral direction at a stretch magnification of 3.6 times. The resultant film was heat-treated at 200° C., thereby forming a film of 7 $\mu$m thick. The properties of the film are shown in Table 4.

The film produced in Example 14 was provided with a back coat on the side where the particles were contained, a base coat layer containing colloidal silica was applied to the film on the side where the particles were not contained, and a magnetic coating agent containing magnetic powder was additionally coated thereon. The resultant film was slitted to produce a magnetic tape. The magnetic tape had good running properties and running stability.

Comparative Example 9

The same procedure as in Example 13 was conducted, except that colloidal silica was used in place of the compound oxide particles, thereby producing a polyester resin B1 and a film using the resin.

Examples 15–19, Comparative Examples 10, 11

The same procedure as in Example 1 was conducted, except that the type of the particles and the content thereof and the M/P ratio were changed, thereby producing polyester composition A2-A5 and B2-B4 each which contained a different type of particles and films using the polyester compositions. The properties and results of the films are shown in Tables 2, 3 and 4. In the film of Example 19, the particles used in Example 18 were mixed in a small amount with the particles used in Example 15 so that the values of *1 and *2 were adjusted to those shown in Table 2. The film of Example 19, however, was slightly poor in abrasion resistance and scratch resistance.

The other particles were polymers which were properly prepared in the same manner as for the polyester resin S or P.

Example 20

The same procedure as in Example 14 was conducted, except that the polyester resin W1 was additionally mixed with the polyester resins Al and X so that content of the wax compound in the sub-layer became that shown in Table 5 and the resultant resin mixture was supplied to the extruder for the sub-layer, thereby producing a polyester film and a magnetic tape. This example seems to use the combination of the wax compound and the compound oxide particles of the present invention. However, the abrasion resistance and scratch resistance were more improved compared with Example 13. The results are shown in Tables 5 and 6.

Examples 21–24

The same procedure as in Example 20 was conducted, except that the types and contents of the particles, the wax compound, the catalyst metal compound the phosphorous compound were changed, thereby producing films. The properties and results are shown in Tables 5 and 6.

Example 25

In Example 25, the same procedure as in Example 20 was conducted, except that colloidal silica was used in place of the compound oxide particles. The film of this example had a good thermal treatment index, but showed poorer abrasion resistance and scratch resistance compared with the films of Examples 21 to 24.

Examples 26, 27

The same procedure as in Example 20 was conducted, except that the type and content of the particles, the type of the wax compound and the content of the phosphorous compound were changed, thereby producing films. The properties and results are shown in Tables 5 and 6.

Example 28

The same procedure as in Example 20 was conducted, except that the type and content of the particles and the content of the phosphorous compound were changed, thereby producing a film. The film had unsatisfactory thermal treatment properties.

TABLE 1

| | Wax (or additive) | Content (wt %) Sublayer | Content (wt %) Main layer | Melt resistivity ($\Omega \cdot cm$) | Film forming ability | Large protuberances (/mm$^2$) | Dimples (Defects) (/mm$^2$) | Thermal treatment index |
|---|---|---|---|---|---|---|---|---|
| Ex. 1 | Stearyl stearate | 0.5 | 0 | $8 \times 10^7$ | A | 8 | 0 | 25 |
| Ex. 2 | ditto | 0.1 | 0 | $7 \times 10^7$ | A | 3 | 0 | 50 |
| Ex. 3 | ditto | 0.15 | 0 | $7 \times 10^7$ | A | 5 | 0 | 45 |
| Ex. 4 | ditto | 1.5 | 0 | $8 \times 10^7$ | A | 11 | 1 | 20 |
| Ex. 5 | ditto | 2.0 | 0 | $9 \times 10^7$ | A | 12 | 3 | 15 |
| Ex. 6 | ditto | 0.2 | 0 | $7 \times 10^7$ | A | 7 | 0 | 40 |
| Ex. 7 | ditto | 0 | 0.5 | $7 \times 10^7$ | A | 9 | 0 | 30 |
| Ex. 8 | ditto | 0.5 | 1.0 | $8 \times 10^7$ | A | 13 | 2 | 20 |
| Ex. 9 | ditto | 0 | 1.0 | $8 \times 10^7$ | A | 14 | 2 | 25 |
| Ex. 10 | Behenyl behenate | 0.5 | 0 | $8 \times 10^7$ | A | 9 | 0 | 35 |
| Ex. 11 | Myristyl stearate | 0.5 | 0 | $8 \times 10^7$ | A | 10 | 0 | 30 |
| Ex. 12 | Stearyl stearate | 0.5 | 0.5 | $7 \times 10^7$ | A | 9 | 0 | 25 |

TABLE 1-continued

| | Wax (or additive) | Content (wt %) Sublayer | Content (wt %) Main layer | Melt resistivity (Ω·cm) | Film forming ability | Large protuberances (/mm²) | Dimples (Defects) (/mm²) | Thermal treatment index |
|---|---|---|---|---|---|---|---|---|
| Ex. 13 | Stearic acid | 0.2 | 0 | 8 × 10⁷ | A | 6 | 0 | 30 |
| | Stearyl alcohol | 0.3 | 0 | | | | | |
| C.Ex.1 | — | 0 | 0 | 7 × 10⁷ | A | 3 | 0 | 105 |
| C.Ex.2 | Stearyl stearate | 0.05 | 0 | 7 × 10⁷ | A | 5 | 0 | 70 |
| C.Ex.3 | ditto | 0 | 0.05 | 7 × 10⁷ | A | 6 | 0 | 75 |
| C.Ex.4 | ditto | 3.0 | 0 | 11 × 10⁷ | B | 24 | 20 | 20 |
| C.Ex.5 | ditto | 0 | 3.0 | 12 × 10⁷ | B | 22 | 21 | 25 |
| C.Ex.6 | DBS-Li | 0.5 | 0 | 18 × 10⁷ | C | 8 | 21 | 25 |
| C.Ex.7 | Carnauba wax | 0.5 | 0 | 8 × 10⁷ | A | 30 | 5 | 30 |
| C.Ex.8 | Polypropylene | 0.5 | 0 | 8 × 10⁷ | A | 3 | 35 | 65 |

TABLE 2

| | | Properties of compound oxide inorganic particles | | | | | | | | | |
|---|---|---|---|---|---|---|---|---|---|---|---|
| | Polyester resin No. | Chemical composition (on molar basis) Al/Si | Chemical composition (on molar basis) K/[Ia] | Chemical composition (on molar basis) [Ia]/Al | Mean particle size (nm) | *1 | *2 | Amount (wt %) | Intrinsic viscosity | Color tone L | Color tone a | Color tone b | M/P |
|---|---|---|---|---|---|---|---|---|---|---|---|---|---|
| Ex.14 | A1 | 0.21 | 0.95 | 1.02 | 170 | <1 | 76 | 0.6 | 0.62 | 54.7 | −2.0 | 5.1 | 2.5 |
| Ex.15 | A2 | 0.21 | 0.98 | 1.10 | 170 | <1 | 80 | 0.4 | 0.65 | 63.1 | −1.2 | 4.9 | 2.5 |
| Ex.16 | A3 | 0.22 | 0.90 | 1.01 | 180 | <1 | 81 | 0.4 | 0.65 | 55.2 | −0.5 | 7.3 | 0.2 |
| Ex.17 | A4 | 0.35 | 0.85 | 1.01 | 60 | <1 | 72 | 1.2 | 0.64 | 54.6 | 0.1 | 9.5 | 2.5 |
| Ex.18 | A5 | 0.16 | 0.91 | 1.15 | 300 | <1 | 63 | 0.05 | 0.64 | 60.4 | −1.2 | 4.2 | 2.5 |
| Ex.19 | B4 | 0.20 | 0.96 | 1.01 | 180 | 2 | 55 | 0.4 | 0.61 | 54.9 | −1.8 | 7.2 | 2.4 |
| C.Ex.9 | B1 | 0 | 0 | — | 170 | <1 | 80 | 0.6 | 0.62 | 65.1 | −1.5 | 4.2 | 2.6 |
| C.Ex.10 | B2 | 0.22 | 0.47 | 1.08 | 180 | <1 | 65 | 0.6 | 0.64 | 52.6 | 2.1 | 16.2 | 2.4 |
| C.Ex.11 | B3 | 0.22 | 0 | 0.98 | 180 | 1 | 60 | 0.6 | 0.63 | 50.1 | 5.2 | 17.9 | 2.5 |

[Ia] Content of metals of group Ia
*1 Percentage (%) of particles having particle sizes at least 4 times larger than the mean particle size.
*2 Percentage (%) of particles having particle sizes within the range of the mean particle size ± 20%.

TABLE 3

| | Polymer composition of sublayer | | | | | |
|---|---|---|---|---|---|---|
| | Inorganic particles Resin No. | Inorganic particles Amount (wt %) | Other particles Chemical composition | Other particles Mean particle size (nm) | Other particles Amount (wt %) | Laminate gauge |
| Ex. 14 | A1 | 0.6 | None | — | — | 0.5 |
| Ex. 15 | A2 | 0.4 | Crosslinked polystyrene | 400 | 0.02 | 1.0 |
| Ex. 16 | A3 | 0.4 | Crosslinked polystyrene | 400 | 0.02 | 1.0 |
| Ex. 17 | A4 | 1.2 | Crosslinked polystyrene | 400 | 0.01 | 1.0 |
| Ex. 18 | A5 | 0.05 | Colloidal silica | 100 | 0.4 | 1.0 |
| Ex. 19 | B4 | 0.4 | Crosslinked polystyrene | 400 | 0.02 | 1.0 |
| C.Ex. 9 | B1 | 0.6 | None | — | — | 1.0 |
| C.Ex. 10 | B2 | 0.6 | None | — | — | 1.0 |
| C.Ex. 11 | B3 | 0.6 | None | — | — | 1.0 |

TABLE 4

| | Gauge variation (%) | Particle dispersibility | Surface roughness (nm) SRa | Surface roughness (nm) SRz | Number of protuberances (/mm²) | $\mu k(50)$ (%) | Abrasion resistance | Scratch resistance | Dropouts (/min.) |
|---|---|---|---|---|---|---|---|---|---|
| Ex.14 | 4 | ○ | 18.2 | 230 | 1 × 10⁵ | 22.2 | ○ | ○ | 15 |
| Ex.15 | 3 | ○ | 13.5 | 280 | 6 × 10⁴ | 14.0 | ○ | ○ | 8 |
| Ex.16 | 8 | ○ | 13.7 | 292 | 6 × 10⁴ | 26.8 | ○ | ○ | 21 |

TABLE 4-continued

| | Gauge variation (%) | Particle dispersibility | Surface roughness (nm) SRa | Surface roughness (nm) SRz | Number of protuberances (/mm$^2$) | μk(50) (%) | Abrasion resistance | Scratch resistance | Dropouts (/min.) |
|---|---|---|---|---|---|---|---|---|---|
| Ex.17 | 3 | Δ | 11.3 | 195 | 7 × 10$^5$ | 37.0 | ○ | ○ | 11 |
| Ex.18 | 4 | ○ | 21.0 | 420 | 4 × 10$^4$ | 32.4 | ○ | Δ | 27 |
| Ex.19 | 3 | ○ | 17.2 | 374 | 5 × 10$^4$ | 61.0 | Δ | Δ | 48 |
| C.Ex.9 | 4 | Δ | 19.3 | 325 | 8 × 10$^4$ | 52.8 | x | x | 37 |
| C.Ex.10 | 3 | ○ | 19.5 | 270 | 1 × 10$^5$ | 50.2 | ○ | Δ | 32 |
| C.Ex.11 | 3 | Δ | 21.3 | 323 | 1 × 10$^5$ | 47.5 | Δ | Δ | 43 |

TABLE 5

| | Polymer composition of sublayer | | | | | | | | |
|---|---|---|---|---|---|---|---|---|---|
| | Inorganic particles | | Other particles | | | Wax compound | | | Laminate |
| | Resin No. | Amount (wt %) | Chemical composition | Mean particle size (nm) | Amount (wt %) | Resin No. | Compound | Amount (wt %) | gauge (μm) |
| Ex.20 | A1 | 0.6 | None | — | — | W1 | Stearyl stearate | 0.6 | 0.5 |
| Ex.21 | A2 | 0.4 | Crosslinked polystyrene | 400 | 0.02 | W1 | Stearyl stearate | 0.6 | 1.0 |
| Ex.22 | A3 | 0.4 | Crosslinked polystyrene | 400 | 0.02 | W1 | Stearyl stearate | 0.6 | 1.0 |
| Ex.23 | A4 | 1.2 | Crosslinked polystyrene | 400 | 0.01 | W1 | Stearyl stearate | 0.2 | 1.0 |
| Ex.24 | A5 | 0.05 | Colloidal silica | 100 | 0.4 | W3 | Palmityl stearate | 0.6 | 1.0 |
| Ex.25 | B1 | 0.6 | None | — | — | W1 | Stearyl stearate | 0.6 | 1.0 |
| Ex.26 | B2 | 0.6 | None | — | — | W4 | Behenyl behenate | 0.6 | 1.0 |
| Ex.27 | B3 | 0.6 | None | — | — | W1 | Stearyl stearate | 0.6 | 1.0 |
| Ex.28 | B4 | 0.4 | Crosslinked polystyrene | 400 | 0.02 | — | None | — | 1.0 |

TABLE 6

| | Gauge variation (%) | Particle dispersibility | Surface roughness (nm) SRa | Surface roughness (nm) SRz | Number of protuberances (/mm$^2$) | μk(50) (%) | Abrasion resistance | Scratch resistance | Dropouts (/min.) | Thermal treatment index |
|---|---|---|---|---|---|---|---|---|---|---|
| Ex.20 | 4 | ○ | 19.1 | 240 | 2 × 10$^5$ | 20.4 | ⊚ | ○ | 14 | 30 |
| Ex.21 | 3 | ○ | 14.2 | 270 | 5 × 10$^4$ | 12.8 | ⊚ | ⊚ | 8 | 25 |
| Ex.22 | 8 | ○ | 14.0 | 280 | 7 × 10$^4$ | 25.2 | ○ | ○ | 19 | 25 |
| Ex.23 | 3 | Δ | 12.8 | 200 | 6 × 10$^5$ | 35.2 | ○ | ○ | 11 | 45 |
| Ex.24 | 4 | ○ | 22.0 | 410 | 5 × 10$^4$ | 30.1 | ○ | ○ | 25 | 30 |
| Ex.25 | 4 | Δ | 19.0 | 330 | 7 × 10$^4$ | 51.5 | x | x | 36 | 30 |
| Ex.26 | 3 | ○ | 19.8 | 280 | 2 × 10$^5$ | 48.2 | ○ | Δ | 32 | 25 |
| Ex.27 | 3 | Δ | 22.0 | 335 | 1 × 10$^5$ | 45.5 | Δ | Δ | 42 | 30 |
| Ex.28 | 3 | ○ | 17.0 | 372 | 4 × 10$^4$ | 60.5 | Δ | Δ | 46 | 95 |

Industrial Applicability

According to the present invention, a film can be provided that has good friction properties, running properties and abrasion resistance by employing and incorporating specific particles and additives. The polyester film according to the present invention has few large protuberances and defects and is good in oligomer deposition preventing properties and productivity, and is free from defects such as omit of data even when used for a long time. Accordingly, the polyester film is particularly suitable for a magnetic recording medium. In particular, when used in a magnetic recording medium having a metallic magnetic layer, a high reliability with less drop-outs can be achieved. The polyester film may also be suitable in other uses including general industrial uses, such as for condensers, heat-sensitive mimeograph and bonding of metal plates.

What is claimed is:

1. A polyester composition comprising:

a polyester resin matrix; and 0.005 to 5% by weight of inorganic particles; wherein the polyester resin matrix contains phosphorous, alkali metal ions and alkaline earth metal ions and wherein the inorganic particles comprise as a major component a compound oxide of silicon dioxide and aluminum oxide, and additionally contain ions of elements in group Ia of the periodic table wherein on a molar basis, 80 to 100% of the ions are potassium ions, such that the ratio on a molar basis of Al/Si is $0.1 \leq Al/Si \leq 0.4$, and the ratio on a molar basis of the ions of elements in group Ia of the periodic table to Al is $0.8 \leq$ (group Ia ions)/Al $\leq 1.2$, and wherein the polyester resin matrix satisfies the following equation:

$$0.3 \leq ((Ma/2)+Mb)/P \leq 3.0$$

wherein Ma is the concentration (mol/kg) of alkali metal ions, Mb is the concentration (mol/kg) of alkaline earth metal ions and P is the concentration (mol/kg) of phosphorus, in the polyester matrix.

2. The polyester composition according to claim 1, wherein said inorganic particles have a mean particle size of 0.01 to 10 μm, wherein of the total number of inorganic particles, at least 60% have a particle size within +20% of the mean particle size, and 1% or less have a Particle size greater than or equal to four times the average particle size.

3. The polyester composition according to claim 2, wherein the composition satisfies the following equations:

$$L-b \leq 45; \text{ and } a \leq 1.5$$

wherein L, a and b represent L value, a value and b value determined according to JIS L-1073, respectively.

4. A polyester film comprising a composition as claimed in claim 2.

5. A laminated polyester film, at least one layer which comprises a polyester composition as claimed in claim 2 being provided in the film.

6. The polyester film according to claim 4, wherein the layer containing said inorganic particles also contains another type of inert particles.

7. The polyester film according to claim 6, wherein the other type of inert particles have a mean particle size 1.5 to 5 times larger or 0.2 to 0.67 times smaller than that of said inorganic particles.

8. The polyester film according to claim 4, wherein the film has a three dimensional surface roughness SRa of 5 to 30 nm and a three dimensional surface roughness SRz of 100 to 500 nm, and protuberances formed on the surface thereof at a density of $1*10^3$ to $1*10^8$ protuberances/mm$^2$.

9. The polyester film according to claim 4, wherein the film, after 50-time repeated running, exhibits a rate of chance in dynamic friction coefficient of 30% or less.

10. A magnetic recording medium having a film as claimed in claim 4 and a magnetic recording layer provided on the film.

11. The magnetic recording medium according to claim 10, wherein the magnetic recording layer is formed by evaporation of a metal.

12. The magnetic recording medium according to claim 11, wherein the magnetic recording layer is formed through a base coat layer.

13. A polyester composition comprising:

a polyester resin matrix containing phosphorous, alkali metal ions and alkaline earth metal ions;

0.005 to 5% by weight of inorganic particles which comprise as a major component a compound oxide of silicon dioxide and aluminum oxide, and additionally contain ions of elements in croup Ia of the periodic table wherein, on a molar basis, 80 to 100% of the ions are potassium ions; and 0.1 to 5.0% by weight of a wax compound formed from an aliphatic carboxylic acid and an aliphatic alcohol or a constituent of the wax compound; wherein the ratio on a molar basis of Al/Si is $0.1 \leq Al/Si \leq 0.4$, and the ratio on a molar basis of the ions of elements in group Ia of the periodic table to Al is $0.8 \leq$ (group Ia ions)/Al $\leq 1.2$; and the polyester resin matrix satisfies the following equation:

$$0.3 \leq ((Ma/2)+Mb)/P \leq 3.0$$

wherein Ma is the concentration (mol/kg) of alkali metal ions, Mb is the concentration (mol/kg) of alkaline earth metal ions and P is the concentration (mol/kg) of phosphorus, in the polyester matrix.

14. The polyester composition according to claim 13, wherein said inorganic particles have a mean particle size of 0.01 to 10 μm, wherein of the total number of inorganic particles, at least 60% have a particle size within +20% of the mean particle size, and 1% or less have a particle size greater than or equal to four times the average particle size.

15. The polyester composition according to claim 13, wherein the composition satisfies the following equations:

$$L-b \leq 45; \text{ and}$$

$$a \leq 1.5$$

wherein L, a and b represent L value, a value and b value determined according to JIS L-1073, respectively.

16. The polyester composition according to claim 13, wherein the aliphatic carboxylic acid has 14 to 20 carbon atoms and the aliphatic alcohol has 14 to 20 carbon atoms.

17. A polyester film comprising a composition as claimed in claim 13.

18. A laminated polyester film, at least one layer which comprises a polyester composition as claimed in claim 13 being provided in the film.

19. The polyester film according to claim 17, wherein the layer containing said inorganic particles also contains another type of inert particles.

20. The polyester film according to claim 19, wherein the other type of inert particles have a mean particle size 1.5 to 5 times larger or 0.2 to 0.67 times smaller than that of said inorganic particles.

21. The polyester film according to claim 17, wherein the film has a three dimensional surface roughness SRa of 5 to 30 nm and a three dimensional surface roughness SRz of 100 to 500 nm, and protuberances formed on the surface thereof at a density of $1*10^3$ to $1*10^8$ protuberances/mm2.

22. The polyester film according to claim 17, wherein the film, after 50-time repeated running, exhibits a rate of change in dynamic friction coefficient of 30% or less.

23. A magnetic recording medium comprising a film as claimed in claim 17 and a magnetic recording layer provided on the film.

24. The magnetic recording medium according to claim 23, wherein the magnetic recording layer is formed by evaporation of a metal.

25. The magnetic recording medium according to claim 23, wherein the magnetic recording layer is provided through a base coat layer.

* * * * *